(12) United States Patent
Junqua et al.

(10) Patent No.: US 6,314,398 B1
(45) Date of Patent: Nov. 6, 2001

(54) APPARATUS AND METHOD USING SPEECH UNDERSTANDING FOR AUTOMATIC CHANNEL SELECTION IN INTERACTIVE TELEVISION

(75) Inventors: Jean-Claude Junqua; Matteo Contolini, both of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,156

(22) Filed: Mar. 1, 1999

(51) Int. Cl.$^7$ ................................................. G10L 15/00
(52) U.S. Cl. .................................. 704/257; 704/275
(58) Field of Search .................................. 704/275, 272, 704/270, 257, 251, 255, 231, 246

(56) References Cited

U.S. PATENT DOCUMENTS

| | | |
|---|---|---|
| 4,305,131 | 12/1981 | Best . |
| 5,663,757 | 9/1997 | Morales . |
| 5,809,471 | 9/1998 | Brodsky . |
| 5,832,439 * | 11/1998 | Cox, Jr. et al. .................. 704/275 |
| 5,844,620 * | 12/1998 | Coleman et al. ................. 348/461 |
| 5,900,905 * | 5/1999 | Shoff et al. ..................... 348/12 |
| 6,133,909 * | 10/2000 | Schein et al. ................... 345/327 |

* cited by examiner

Primary Examiner—Richemond Dorvil
(74) Attorney, Agent, or Firm—Harness, Dickey & Pierce, P.L.C.

(57) ABSTRACT

A speech understanding system for receiving a spoken request from a user and processing the request against a knowledge base of programming information for automatically selecting a television program is disclosed. The speech understanding system includes a knowledge extractor for receiving electronic programming guide (EPG) information and processing the EPG information for creating a program database. The system also includes a speech recognizer for receiving the spoken request and translating the spoken request into a text stream having a plurality of words. A natural language processor is provided for receiving the text stream and processing the words for resolving a semantic content of the spoken request. The natural language processor places the meaning of the words into a task frame having a plurality of key word slots. A dialogue manager analyzes the task frame for determining if a sufficient number of key word slots have been filled and prompts the user for additional information for filing empty slots. The dialog manager searches the program database using the key words placed within the task frame for selecting a program, and produces a signal for selecting a television channel associated with the program.

20 Claims, 2 Drawing Sheets

APPARATUS AND METHOD USING SPEECH UNDERSTANDING FOR AUTOMATIC CHANNEL SELECTION IN INTERACTIVE TELEVISION

BACKGROUND OF THE INVENTION

1. Technical Field

The present invention is directed to an apparatus and method using speech understanding for automating the channel selection process in interactive television. More particularly, the present invention is directed to a system which utilizes natural language processing for receiving a spoken channel selection request and processing the request against information extracted from an electronic programming guide for automatically selecting a channel.

2. Discussion

The design of interactive television allows two-way communication. Unlike conventional one-way television (TV) or radio broadcasts, most interactive TV enables viewers to respond by telephone. Interactive TV helps people understand complex programs and absorb large amounts of information quickly. Digital television is a new, more efficient method of television transmission which can broadcast several television channels into the space currently used to carry a single analog channel. This will create opportunities for many more new channels and program services.

In the future, it is expected that all television services will be transmitted digitally. By using digital technology, approximately 200 channels, perhaps more, will be made available. Digital transmission also has the potential to offer other advantages to the viewer, such as high definition or wide-screen pictures, CD-quality sound, and near "video-on-demand," where a film is shown with different start times on several different channels so that the viewer can choose a convenient time to start watching. Interactive services such as home banking, home shopping and connection to the internet could also be made available digitally through the television set.

Viewers who choose to receive digital television by any of these methods will likely need to either buy or rent a special digital receiver or set-top box decoder which will enable digital television pictures to be reassembled on screen. Television sets will also be available with this decoder built in. The set-top box will include a processor that can be used to provide additional services such as speech recognition and speech understanding.

As the number of television channels increase, the viewer will have more and more difficulty making a channel selection. Instead of finding the desired channel by browsing through the entire listing of channels, channel selection can be made by understanding the semantic content of what the viewer wants to see through analyzing the content of the spoken request. By using natural language and dialogue, the viewer would be able to select the desired program and television channel using spoken requests.

In view of the above, it is desirable to create a knowledge representation of electronic program guide (EPG) information which is broadcasted as one of many television signals, and store this information in the TV or in the set-top box. It is also desirable to provide a system which can extract the semantics of the user's spoken program selection request, and apply this request against the EPG knowledge database for searching for the desired program and switching the television to the corresponding channel. Finally, it is desirable to provide a system for interacting with the user by employing a dialogue phase for clarifying the user request or resolving ambiguities.

SUMMARY OF THE INVENTION

The method and apparatus of the present invention utilizes a speech understanding technique for automatically selecting channels on a television or video recording device after searching the content of the broadcasts and an electronic programming guide (EPG). This technique uses natural language and dialogue for selecting the desired TV program based upon spoken requests. Using the content of the EPG containing TV program information along with summaries of some events, such as movies, a dynamic recognition vocabulary is created. This vocabulary contains the key words and phrases that can be recognized and understood by the system. This vocabulary is completed by non-key words that are likely to be used by a viewer when selecting channels (e.g. "I would" or "please").

A database of grammar data structures containing a priori knowledge about the meaning of key words such as "sports" or "movies" is used by a natural language processor to understand the semantic content of the spoken request. Furthermore, a representation of the channel selection task semantics is used by a dialogue manager to help the user in performing the request. The natural language processor utilizes local and global parsing modules for identifying the semantically relevant portions of the spoken request and sends this information to the dialogue manager. The natural language processor also organizes the words and phrases, once understood, into a semantic representation of the spoken request.

The channel selection semantic representations contain information such as the program to select, the time, possibly the channel or network, etc. The viewer can select a channel but also ask information about what will be available on a particular day or time. The information can be provided to the user as audio responses or displayed on the television screen. Because of the natural language processor, the viewer can concentrate on his/her goal without worrying about the style of language he/she uses to communicate with the speech understanding device. A split screen mode may be used when there is ambiguity to allow the user to further refine the request.

A history database of the user preferences (in terms of preferred sports or movie types) is built automatically by the dialogue manager. This history database may contain records of past spoken requests and dialogues which can be used by the dialogue manager to dynamically modify the language model of the speech understanding device to favor some of the words during recognition. This history database can also be used during the dialogue phase to rank the questions to ask according to the user preferences.

The speech understanding device can also be used for programming a video recording device by linking the channel selection to the record command of the recording device. For programs that are recorded frequently, macros can be established as an additional feature for the user. Similarly, reminders can be used to let the viewer know, for example, that a basketball game will be broadcasted tomorrow.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF THE INVENTION

Figure 1:
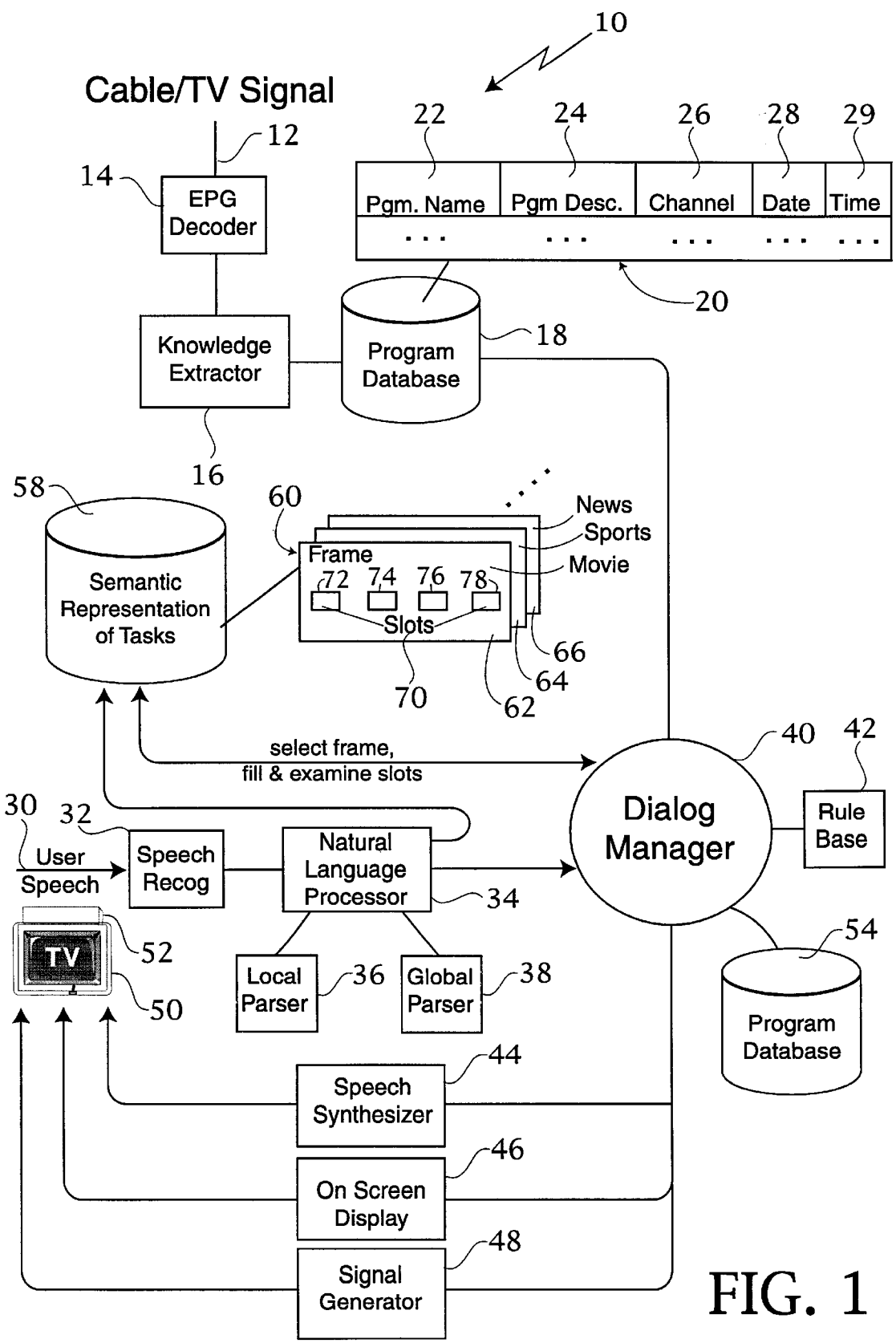
FIG. 1 is a schematic diagram showing the speech understanding and channel selection system according to a preferred embodiment of the present invention.

In accordance with the teachings of the present invention, a system and method using speech understanding for automatically selecting a television channel is disclosed. FIG. 1 illustrates the speech understanding and channel selection system 10 according to a preferred embodiment of the present invention. It is preferred that the channel selection system 10 is incorporated into a set-top decoder box 52. However, the system 10 can also be incorporated into a television 50, or alternatively into a satellite tuner or video playback/recording device.

As part of the present invention, a cable or television signal 12 provides electronic programming guide (EPG) information to the channel selection system 10. Although it is contemplated that the EPG information can also be downloaded via a telecommunications line from an internet based service provider or a dedicated dial-up EPG service provider. The television signal 12 is also made available for viewing and/or recording. An EPG decoder 14 receives the EPG information for display if desired. The EPG decoder 14 also converts and formats the EPG information into textual information which is communicated to a knowledge extractor 16. The knowledge extractor 16 is responsible for reorganizing the EPG information into a searchable format for storage within a program database 18.

The program database 18 includes a plurality of searchable program records with a set of predefined fields, such as, but not limited to a program name field 22, a program description or subject matter field 24, a channel field 26, a date field 28, and a time field 29. The program database 18 is continually updated with new program records 20 as the information content of the EPG changes. Therefore, spoken requests can be processed at any time without waiting for updates to the program database 18. In addition, the expired program records 20 within the program database 18 are purged at periodic time intervals so that only a limited and manageable number of program records 20 are searched by the channel selection system 10 for satisfying the user's spoken request.

On the speech processing side of the channel selection system 10, the spoken request and spoken information represented as user speech at 30 is received by a speech recognizer 32. The spoken words are processed by the speech recognizer 32 and converted into text. A suitable speech recognizer is that taught in Lee, K., Large Vocabulary Speaker Independent Continuous Speech Recognition; The Sphinx Systems, Ph.D. Thesis, Carnegie Mellon University, 1988. The text stream which is output from the speech recognizer 32 is provided to a natural language processor 34, which is primarily responsible for analyzing the text stream and resolving the semantic content and meaning of the spoken request. The speech understanding analysis executed by the natural language processor 34 is performed by a local parser module 36 and a global parser module 38. The details of the natural language processor 34 and its components are described in greater detail below.

A processor based dialogue manager 40 interacts with the various modules of the channel selection system 10, including the natural language processor 34. The dialogue manager 40 communicates with a task database 58 which contains semantic representation of the requested tasks. The task database 58 includes a plurality of predefined task frames 60 which contain a semantic representation of the tasks associated with the user's spoken request. As shown, the task frames 60 include a movie task frame 62, a sports task frame 64 and a news task frame 66. While only three task frames 60 are shown, it should be understood that many other task frames can be designed for use with the present invention. Each task frame 60 includes a plurality of key word slots 70 for storing the understood meaning of the key words which are parsed from the user's spoken request. As will be described in greater detail below, the frames and slots are filled with data by the global parser module 38 within the natural language processor 34.

The dialogue manager 40 retrieves programming records 20 from the program database 18 using the search criteria contained in the selected task frame 60. The search function performed by the dialogue manager 40 is assisted by a rule base 42, which will be described in greater detail below. A request history database 54 is maintained by the dialogue manager 40 for storing a history of the user preferences, such as preferred sports or movie types for viewing and/or recording.

The dialogue manager 40 has the ability to provide output to a speech synthesizer 44 which can produce an audible inquiry to the user. The dialogue manager 40 may also provide output to an on screen display (OSD) module 46 for presenting the inquiry to the user via a connected television screen 50. Finally, the dialogue manager 40 can provide output to a signal generator module 48 which can translate the output into the appropriate signal for changing the channel on the television 50 or set-top box 52. It is contemplated that as part of the present invention, the signal generator module 48 can produce a variety of commonly used infrared signals which are compatible with the remote command receiver found on most televisions, cable interface boxes, satellite receivers and video recording devices. In this fashion, the dialogue manager 40 can direct the signal generator module 48 to automatically change the television channel, or even program the video recording device to record a program from a desired channel at a particular time and day.

Figure 2:
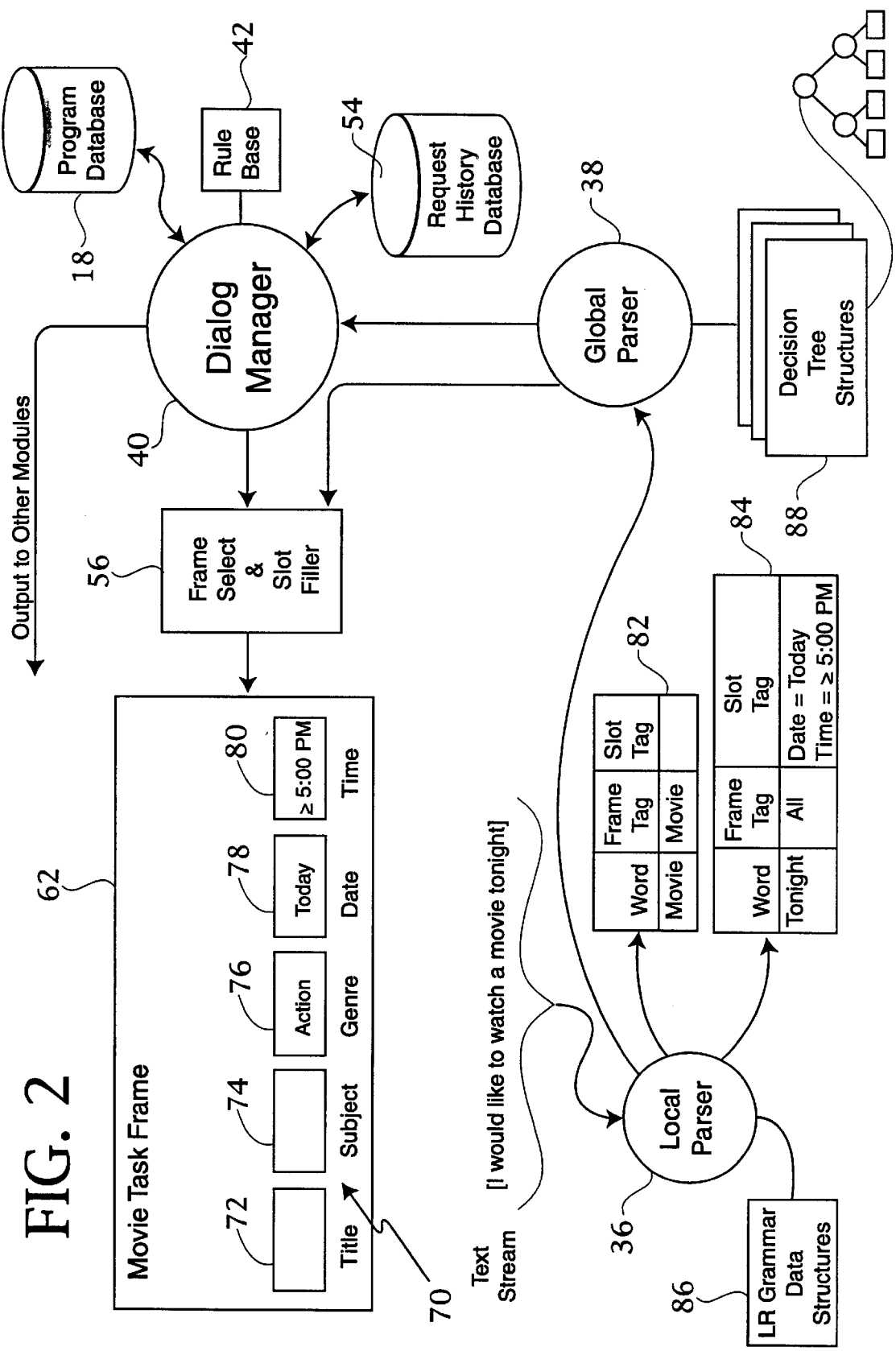
FIG. 2 is a schematic diagram disclosing the speech understanding technique performed by the natural language processor and the dialogue manager shown in FIG. 1.

The operation of the natural language processor 34 is shown in FIG. 2. As described above, the natural language processor 34 includes a local parser 36 and a global parser 38 for further analyzing and understanding the semantic content of the digitized words provided by the speech recognizer 32. The local parser 36 has the ability to analyze words, phrases, sentence fragments, and other types of spoken grammatical expressions. To simplify the explanation of the natural language processor 34, all of the grammatical expressions which can be recognized and understood will hereinafter be referenced to as words. Thus, the reference to words should be understood to include phrases, sentence fragments, and all other types of grammatical expressions.

The local parser 36 examines the words using a LR grammar module 86 to determine if the word is a key word or a non-key word. When a word is recognized as a key word, the word (or phrase, etc.) is "tagged" with a data structure which represents the understood meaning of the word. This examination is accomplished using a database of grammar data structures which comprise the vocabulary of the system. Thus, each recognizable word or phrase has an associated grammar data structure which represents the tag for the word. Once the correct grammar data structure is identified by the local parser 36, a tagging data structure for the word is generated, such as tagging data structure 82 or

84, defining the meaning of the word. The goal of the local parser 36 is to tag all of the spoken words, identified as key words, with the appropriate tagging data structure. The goal of the global parser 38 is to place all of the tagged words into the key word slots 70 of a chosen task frame 60.

In operation, the local parser 36 receives each word and using the LR grammar module 86 retrieves the grammar data structure associated with that word. The grammar structure for the word will tell the local parser 36 whether or not the word is a key word, and instruct the local parser 36 how to generate the appropriate tagging data structure 82, 84. If the word is not a key word, it is placed into a buffer in case further analysis by the global parser 38 is required. If the word is a key word, the grammar data structure will contain information on how to generate the tagging data structure. If the word is not a key word, the frame tag and slot tag fields will be empty, and the nonkey word will be buffered. This frame and slot tag information allows the global parser 38 to place the key word into the appropriate slot 70 of the appropriate task frame 60. This process is assisted by the frame select and slot filler module 56. In the case of some key words, multiple frames may be applicable, and the tagging data structure 82, 84 will indicate that the same slot 70 of two different task frames 60 should be filled with the same key word. The correct task frame 60 can then be chosen during later iterations by the global parser 38.

An example of a spoken request might be "I would like to watch a movie tonight". This exemplary request contains several key words, namely, "watch", "movie" and "tonight". The remaining words are assumed to be non-key words. However, a dialogue phase may be necessary with this exemplary request in order to resolve the specifics of which movie the user would like to watch, and at what time the user would like to begin watching (or recording). As part of the present analysis technique, the local parser 36 would individually process the words "I" "would" "like" and "to", determine that these words are non-key words, and place these non-key words into a buffer (not shown). The local parser 36 then retrieves the grammar data structure for the word "watch," generates the tagging data structure, and tags the word with the tagging data structure. The tagged word is then passed to the global parser 38 which can determine that the user's desired action is to watch a program, as opposed to record a program, or inquire as to what programs are on at a future date and/or time.

The tagging data structure for the word "movie", shown as data structure 82, will indicate that the movie task frame 62 should be selected. However, a key word slot 70 will not be designated for the word "movie" because this key word is better associated with a task frame 60. The tagging data structure 84 for the word "tonight" will indicate that the semantic representation of this key word should be placed into the date slot 78 of any of the task frames 60. However, the global parser 38 will have already decided that the date slot 78 of the movie task frame 62 should be filled with the understood meaning of the word "tonight." Additionally, the tagging data structure can indicate that the time slot 80 of the movie task frame 62 should be filled with a time value of greater than or equal to 5:00 PM. This way, the dialogue manager 40 can recognize that the user wishes to search for programs with today's date which play in the evening.

At this point the local parser 36 has tagged all of the words within the spoken request, and the global parser 38, along with the frame select and slot filler module 56, has selected the appropriate task frame 60 for building the search request and filled the appropriate slots 70 with the understood meaning of the words. Next, the dialogue manager 40 can query the user for more specific information. The dialogue manager 40 knows which questions to ask the user based upon which key word slots 70 within the movie task frame 62 must be filled. For example, if the time slot 80 is empty, the dialogue manager 40 may ask the user "at what time would you like to watch a movie?". If the user responds with a spoken time, or time range, the local parser 36 will tag the key words relating to time using the technique described above, and the global parser 38 will place these key words into the time slot 80 of the movie task frame 62.

The global parser 38 is primarily responsible for analyzing the tagging data structure generated by the local parser 36, for identifying the meaning of the word within the context of the spoken request, and then placing the meaning of the word in the appropriate slot 70. The global parser 38 is comprised of many decision tree structures 88. A particular decision tree 88 is utilized once the context of the spoken command is determined. Each decision tree 88 has a starting point, and terminates at a particular action. The action at the terminus of the decision tree 88 instructs the global parser 38 where to place the word, or how to resolve the particular ambiguity. In the case of the present invention, the action will typically instruct the global parser 38 as to which task frame 60 should be selected, or into which key word slot 70 a particular tagged word should be placed.

A rule base 42 assists the dialogue manager 40 in determining which combinations of filled key word slots 70 provide enough information to perform a search within the program database 18. For example, if the time key word slot 80 of the movie task frame 62 is filled, the dialogue manager 40 can search the program database 18 for all movies that begin at the requested time or during a time range. However, if the search produces more than a predetermined number of movies at the requested time, the dialogue manager 40 may ask the user "what type of movie would you like to watch?". At this point, the dialogue manager 40 is attempting to fill the subject key word slot 74 or genre key word slot 76 within the movie task frame 62. If the user responds with a spoken subject or genre, the local parser 36 will tag the key words relating to the subject or genre using the technique described above. These newly tagged words will then be passed to the global parser 38 and placed into the appropriate slots 70 of the movie task frame 62.

For example, if the user responds with "action movie", the global parser 38 will place the word "action" into the genre slot 76, and again the dialogue manager 40 will narrow its search. If only one action movie is available at the desired time, the dialogue manager 40 will instruct the signal generator 48 to automatically switch the television 50 or set-top box 52 to the channel appearing in the program record 20. If several action movies are available at the desired time, the dialogue manager 40 may list all of the available action movies via the OSD module 46. At this point, the user may select the desired movie by number or channel. As an alternative feature of the present invention, the dialogue manager 40 may provide a confirmation of the user's request as feedback to the user prior to switching the channel.

As the user learns to provide the dialogue manager 40 with a complete set of information within one spoken request, such as "I would like to watch the Detroit Red Wings hockey game tonight", or "I would like to record the program Nova on PBS this Tuesday", the natural language processor 34 can fill enough key word slots 70 to permit a search to be performed, and the spoken request fully satisfied by the dialogue manager 40. In the case of the request to watch the hockey game, the dialogue manager 40 will complete the search and produce the appropriate signal for changing the channel of the set-top box 52 or television 50 based upon the information contained within the channel field 26 of the programming record 20. In the case of the request to record the desired program from PBS, the dialogue manager 40 will complete the search and retrieve the date, time and channel information from the programming record 20 and produce the appropriate signal via signal generator module 48 for programming the video recording device.

As part of the present invention, it is further contemplated that the dialogue manager 40 can receive feedback signals from the video recording device in cases where the device is already programmed to record a different program at the same time, or that a blank tape must be inserted into the recording device. In this manner, various conflicts can be resolved while the user is present.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A speech understanding system for receiving a spoken request from a user and processing the request against a knowledge base of programming information for automatically selecting a television program comprising:

a knowledge extractor for receiving electronic programming guide (EPG) information and processing the EPG information for creating a program database;

a speech recognizer for receiving the spoken request and translating the spoken request into a text stream having a plurality of words;

a natural language processor for receiving the text stream and processing the words for resolving a semantic content of the spoken request, the natural language processor placing the meaning of the words into a task frame having a plurality of key word slots; and a dialogue manager for analyzing the task frame for determining if a sufficient number of key word slots have been filled and prompting the user for additional information for filing empty slots, the dialog manager searching the program database using the key words placed within the task frame for selecting a program, and producing a signal for selecting a television channel associated with the television program.

2. The system of claim 1 wherein the natural language processor includes a local parser for analyzing the words within the text stream and identifying key words, the local parser utilizing a LR grammar database for resolving the meaning of the words.

3. The system of claim 2 wherein the local parser generates a tagging data structure for each key word, the tagging data structure representing the meaning of the key word.

4. The system of claim 3 wherein the natural language processor includes a global parser for receiving the tagging data structure for each key word and for selecting the task frame associated with the meaning of the spoken request.

5. The system of claim 4 wherein the global parser interacts with a plurality of decision trees for determining which task frame is associated with the meaning of the spoken request.

6. The system of claim 4 wherein the global parser receives the tagging data structure for each key word and places a meaning of the key word into a key word slot.

7. The system of claim 1 wherein the dialogue manager interacts with a rule base for determining when the task frame contains enough information for searching the program database.

8. The system of claim 1 wherein the dialogue manager prompts the user for additional information through a speech synthesizer.

9. The system of claim 1 wherein the dialogue manager prompts the user for additional information through a display system.

10. The system of claim 1 wherein a signal generator is connected to the dialogue manager for receiving a command and generating a signal for operating a remote receiver.

11. The system of claim 1 wherein the program database includes a plurality of program records relating to each program and channel combination available for selection by the user.

12. A speech understanding system for receiving a spoken request from a user and processing the request against a knowledge base of programming information for automatically selecting a television program comprising:

a knowledge extractor for receiving electronic programming guide (EPG) information and processing the EPG information for creating a program database;

a speech recognizer for receiving the spoken request and translating the spoken request into a text stream having a plurality of words;

a natural language processor for receiving the text stream and processing the words for resolving a semantic content of the spoken request, the semantic content being represented by a task frame having a plurality of key word slots;

the natural language processor including a local parser for analyzing the words using a database of grammar structures and generating a tagging data structure representing the meaning of the word;

the natural language processor including a global parser for selecting a task frame and placing the meaning of the words contained in the tagging data structure into the key word slots within the task frame; and a dialogue manager for analyzing the task frame for determining if a sufficient number of key word slots have been filled and prompting the user for additional information until a predetermined combination of slots have been filled, the dialog manager searching the program database using the key words placed within the task frame for selecting a program, and producing a signal for selecting a television channel associated with the television program.

13. The system of claim 12 wherein the global parser receives the tagging data structure for each key word and selects the task frame associated with the meaning of the spoken request.

14. The system of claim 12 wherein the global parser interacts with a plurality of decision trees for determining which task frame is associated with the meaning of the spoken request.

15. The system of claim 12 wherein the tagging data structure for each tagged word includes a frame tag indicating which task frame the word is associated with and a slot tag indicating which key word slot the meaning of the word is associated with.

16. The system of claim 12 wherein the dialogue manager interacts with a rule base for determining when the task frame contains the predetermined combination of filled slots.

17. The system of claim 12 wherein the EPG information is received from one of a television signal, a cable television signal, a satellite television signal and a telecommunication signal.

18. A method for understanding a spoken request and selecting a television channel based upon the spoken request comprising:

receiving electronic programming guide (EPG) information;

processing the EPG information for producing a program database;

receiving the spoken request from a user and processing the spoken request with a natural language processor for extracting a semantic representation of the task requested by the user based on both speech recognition to generate recognized words and grammar parsing using a database that associates grammar data structures with said recognized words;

building a search request of key words identified by the natural language processor;

performing a search within the program database using the key words; and generating a signal for selecting a television channel associated with the desired program.

19. The method of claim 18 further including the step of initiating a dialog phase using a dialog manager for prompting a user for additional information.

20. The method of claim 18 further including the step of analyzing the user request using a database of grammar structures and generating one or more tagging data structures representing the meaning of the spoken request.

* * * * *